(12) United States Patent
Kim et al.

(10) Patent No.: US 11,352,001 B2
(45) Date of Patent: Jun. 7, 2022

(54) METHOD FOR CONTROLLING DECELERATION OF ENVIRONMENTALLY FRIENDLY VEHICLE

(71) Applicants: Hyundai Motor Company, Seoul (KR); Kia Motors Corporation, Seoul (KR)

(72) Inventors: Do Hee Kim, Gyeonggi-do (KR); Kyu Hwan Jo, Gyeonggi-do (KR); Dong Jin Sohn, Gyeonggi-do (KR); Jaekyu Hyun, Daegu (KR); Jee Wook Huh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 353 days.

(21) Appl. No.: 16/366,645

(22) Filed: Mar. 27, 2019

(65) Prior Publication Data
US 2020/0130686 A1    Apr. 30, 2020

(30) Foreign Application Priority Data

Oct. 26, 2018 (KR) ........................ 10-2018-0128626

(51) Int. Cl.
*B60W 30/14* (2006.01)
*G06K 9/00* (2022.01)
*G06V 20/58* (2022.01)

(52) U.S. Cl.
CPC ......... *B60W 30/143* (2013.01); *G06V 20/582* (2022.01); *G06V 20/584* (2022.01); *B60W 2552/15* (2020.02); *B60W 2555/60* (2020.02)

(58) Field of Classification Search
CPC .......... B60W 10/18; B60W 30/18127; B60W 20/11; B60W 20/14; B60L 7/18
See application file for complete search history.

(56) References Cited

U.S. PATENT DOCUMENTS

| 2007/0027583 | A1* | 2/2007 | Tamir | G08G 1/164 701/1 |
| 2014/0303868 | A1* | 10/2014 | Otake | B60W 30/18109 701/70 |
| 2014/0309903 | A1* | 10/2014 | Otake | G08G 1/096725 701/70 |
| 2014/0335994 | A1* | 11/2014 | Otake | F02N 11/0837 477/3 |
| 2014/0379213 | A1* | 12/2014 | Otake | B60W 20/10 701/36 |
| 2016/0101780 | A1* | 4/2016 | Park | B60W 50/0097 701/70 |
| 2017/0051652 | A1* | 2/2017 | De Smet | F01N 3/023 |
| 2017/0351262 | A1* | 12/2017 | Suzuki | G05D 1/0257 |
| 2018/0134296 | A1* | 5/2018 | Oh | B60W 10/06 |

(Continued)

*Primary Examiner* — Peter D Nolan
*Assistant Examiner* — Demetra R Smith-Stewart
(74) *Attorney, Agent, or Firm* — Fox Rothschild LLP

(57) ABSTRACT

A method for controlling deceleration of an environmentally friendly vehicle is provided. The method includes determining a target deceleration profile of the environmentally friendly vehicle based on deceleration event information in ahead of the vehicle and a current speed of the vehicle. A deceleration target speed profile of the vehicle is calculated based on the target deceleration profile. A driving motor of the vehicle is then operated based on the deceleration target speed profile to decelerate the vehicle.

12 Claims, 7 Drawing Sheets

(56) References Cited

U.S. PATENT DOCUMENTS

| | | | |
|---|---|---|---|
| 2018/0252178 A1* | 9/2018 | Payne | B60W 20/00 |
| 2018/0345965 A1* | 12/2018 | Payne | B60W 30/18009 |
| 2019/0001984 A1* | 1/2019 | Huh | B60W 20/15 |
| 2019/0106108 A1* | 4/2019 | Wienecke | B60W 30/162 |
| 2019/0126928 A1* | 5/2019 | Sakaguchi | B60W 10/06 |
| 2019/0185004 A1* | 6/2019 | Kim | B60W 30/18154 |
| 2020/0070790 A1* | 3/2020 | Staats | B60T 8/172 |
| 2020/0079348 A1* | 3/2020 | Kim | B60W 20/14 |

\* cited by examiner

FIG. 7

| Current speed (KPH) | Over 100 | 100 ~ 80 | 80 ~ 60 | 60 ~ 40 | 40 ~ 20 |
|---|---|---|---|---|---|
| Target deceleration (m/s$^2$) | a | b | c | d | e |

METHOD FOR CONTROLLING DECELERATION OF ENVIRONMENTALLY FRIENDLY VEHICLE

CROSS-REFERENCE TO RELATED APPLICATION

This application claims priority to and the benefit of Korean Patent Application No. 10-2018-0128626 filed on Oct. 26, 2018, the entire contents of which are incorporated herein by reference.

BACKGROUND

(a) Field of the Invention

The present invention relates to a control method and system for a vehicle, and more particularly, to a method and system for controlling deceleration of an environmentally friendly vehicle.

(b) Description of the Related Art

An environmentally-friendly vehicle includes a fuel cell vehicle, an electric vehicle, a plug-in electric vehicle, and a hybrid vehicle, and typically includes a motor that generates a driving force. A hybrid vehicle, which is an example of the environmentally-friendly vehicle, uses an internal combustion engine and power of a battery together as power sources. In other words, the hybrid vehicle efficiently combines and uses power of the internal combustion engine and power of a motor.

The hybrid vehicle includes an engine, a motor, an engine clutch to adjust power between the engine and the motor, a transmission, a differential gear apparatus, a battery, a starter-generator that starts the engine or generates electricity by output of the engine, and wheels. Further, the hybrid vehicle may include a hybrid control unit (HCU) configured to operate the hybrid vehicle, an engine control unit (ECU) configured to operate the engine, a motor control unit (MCU) configured to operate the motor, a transmission control unit (TCU) configured to operate the transmission, and a battery control unit (BCU) configured to operate and manage the battery.

The battery control unit may be referred to as a battery management system (BMS). The starter-generator may be referred to as an integrated starter and generator (ISG) or a hybrid starter and generator (HSG). The hybrid vehicle may be driven in a driving mode, such as an electric vehicle (EV) mode, which is an electric vehicle mode using power of the motor, a hybrid electric vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery.

The above information disclosed in this section is merely for enhancement of understanding of the background of the invention, and therefore it may contain information that does not form the prior art that is already known in this country to a person of ordinary skill in the art.

SUMMARY

The present invention provides a method for controlling deceleration of an environmentally friendly vehicle which is capable of calculating a deceleration target speed profile of the vehicle based on deceleration event information in front of the vehicle and deceleration based on a current speed of the vehicle and of simultaneously achieving deceleration driving performance and deceleration target speed following performance through a control that follows the deceleration target speed profile.

An exemplary embodiment of the present invention may provide the method for controlling deceleration of the environmentally friendly vehicle, including: determining, by a controller, a target deceleration profile of the environmentally friendly vehicle based on deceleration event information in front of the vehicle and a current speed of the vehicle; calculating, by the controller, a deceleration target speed profile of the vehicle based on the target deceleration profile; and operating, by the controller, a driving motor of the vehicle based on the deceleration target speed profile to decelerate the vehicle. The determining the target deceleration profile of the environmentally friendly vehicle may include: when a road on which the vehicle decelerates has a slope, determining, by the controller, the target deceleration profile using the slope or inclination of the road.

The method for controlling deceleration of the environmentally friendly vehicle may further include: when the controller receives the deceleration event information including traffic light information and traffic situation information that are related to driving of the vehicle, determining, by the controller, whether the vehicle is predicted to be stopped due to a traffic light included in the traffic light information based on the traffic light information and the traffic situation information; and advancing, by the controller, a deceleration target point of the vehicle to determine the target deceleration profile in response to determining that the vehicle will be stopped due to the traffic light.

The method for controlling deceleration of the environmentally friendly vehicle may further include: when the vehicle is predicted not to be stopped due to the traffic light, determining, by the controller, whether the vehicle is decelerated due to the signal of the traffic light based on the traffic light information and the traffic situation information; and in response to determining that the vehicle is decelerated due to the traffic light, decreasing, by the controller, a deceleration target speed of the deceleration target speed profile.

The calculating of the deceleration target speed profile of the vehicle may include: calculating, by the controller, the deceleration target speed profile by integrating the target deceleration profile over deceleration travel time of the vehicle. The deceleration event information may include static traffic information and dynamic traffic information. A target deceleration of the target deceleration profile may be large when the current speed of the vehicle is small. A target deceleration of the target deceleration profile may correspond to speeds of a predetermined range including the current speed of the vehicle.

The method for controlling deceleration of the environmentally friendly vehicle according to the exemplary embodiment of the present invention may satisfy the deceleration driving performance and the deceleration target speed following performance and may charge a battery of the vehicle using electricity generated by the driving motor when deceleration control corresponding to coasting control of the vehicle is performed. Further, the exemplary embodiment of the present invention may be applied to deceleration control for enhancement of fuel efficiency of an autonomous vehicle.

BRIEF DESCRIPTION OF THE DRAWINGS

A brief description of the drawings will be provided to more sufficiently understand the drawings which are used in the detailed description of the present invention.

FIG. 7 is a table illustrating an exemplary embodiment of the process of determining the target deceleration profile shown in FIG. 2 according to an exemplary embodiment of the present invention.

DETAILED DESCRIPTION

Figure 1:
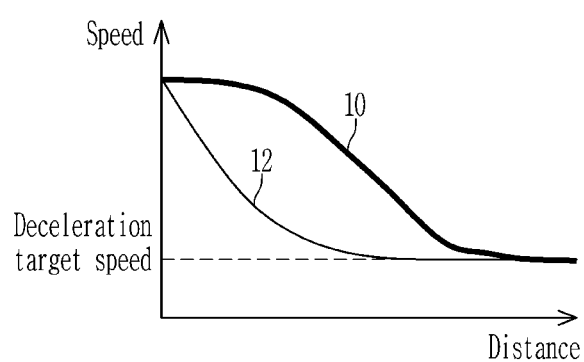
FIG. 1 is a graph describing a control that decelerates an environmentally friendly vehicle to a constant target speed according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to sufficiently understand the present invention and the object achieved by embodying the present invention, the accompanying drawings illustrating exemplary embodiments of the present invention and contents described in the accompanying drawings are to be referenced.

Hereinafter, the present invention will be described in detail by describing exemplary embodiments of the present invention with reference to the accompanying drawings. In describing the present invention, well-known configurations or functions will not be described in detail since they may unnecessarily obscure the gist of the present invention. Throughout the accompanying drawings, the same reference numerals will be used to denote the same components.

Throughout this specification and the claims that follow, when it is described that an element is "coupled" to another element, the element may be "directly coupled" to the other element or "electrically or mechanically coupled" to the other element through a third element. Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise. Unlike a typical internal combustion engine vehicle, an environmentally friendly vehicle may collect energy using a drive motor when the vehicle decelerates.

FIG. 1 is a graph describing a control that decelerates an environmentally friendly vehicle to a constant target speed. Referring to FIG. 1, a reference numeral 10 may indicate a driving control for the vehicle based on deceleration driving performance of the vehicle, and a reference numeral 12 may indicate a control for the vehicle based on deceleration target speed following performance of the vehicle.

When the environmentally friendly vehicle is decelerated based on the deceleration driving performance, the deceleration target speed following performance of the vehicle may become poor. In other words, it may be difficult for the vehicle to maintain a deceleration target speed. When the environmentally friendly vehicle is decelerated based on the deceleration target speed following performance, the deceleration driving performance of the vehicle may be deteriorated and thus, a deceleration feeling of the vehicle may be degraded when the vehicle approaches a deceleration target point and traffic flow may be obstructed due to rapid deceleration.

Figure 2:
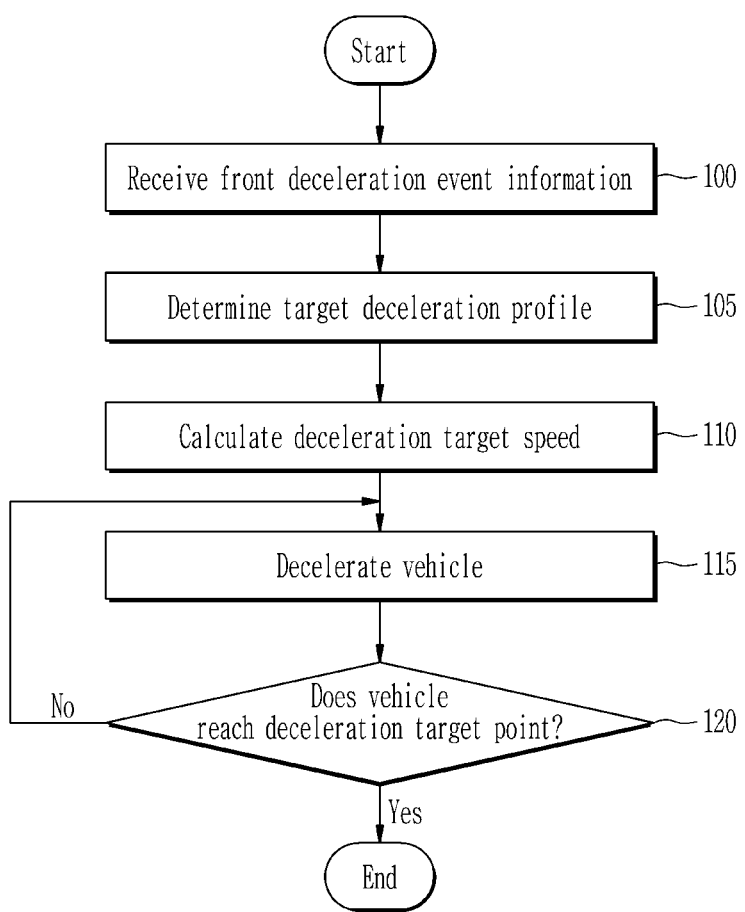
FIG. 2 is a flowchart illustrating a deceleration control method for an environmentally friendly vehicle according to an exemplary embodiment of the present invention.
Figure 3:
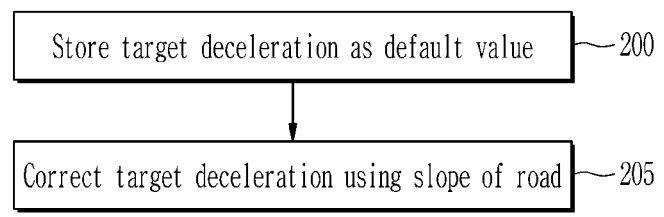
FIG. 3 is a flowchart illustrating a process of determining a target deceleration profile of the environmentally friendly vehicle shown in FIG. 2 according to an exemplary embodiment of the present invention.
Figure 4:
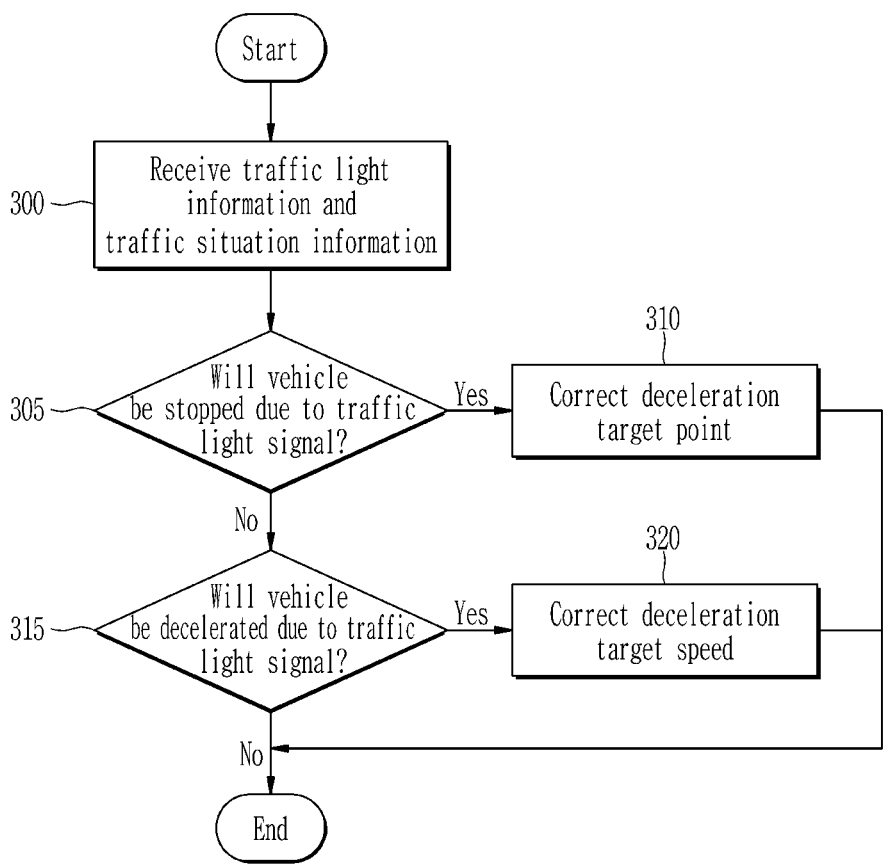
FIG. 4 is a flowchart illustrating the process of determining the target deceleration profile and calculating a deceleration target speed of the vehicle shown in FIG. 2 according to an exemplary embodiment of the present invention.
Figure 5:
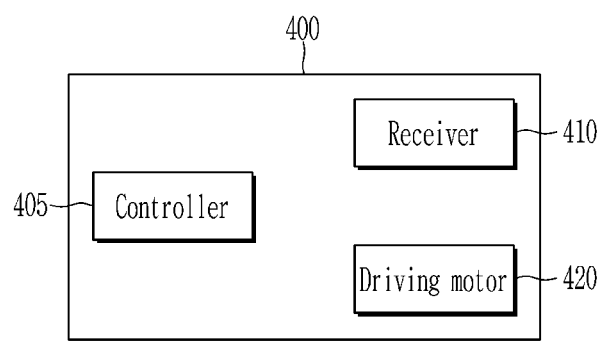
FIG. 5 is a block diagram illustrating the environmentally friendly vehicle to which the deceleration control method shown in FIG. 1 is applied according to an exemplary embodiment of the present invention.
Figure 6:
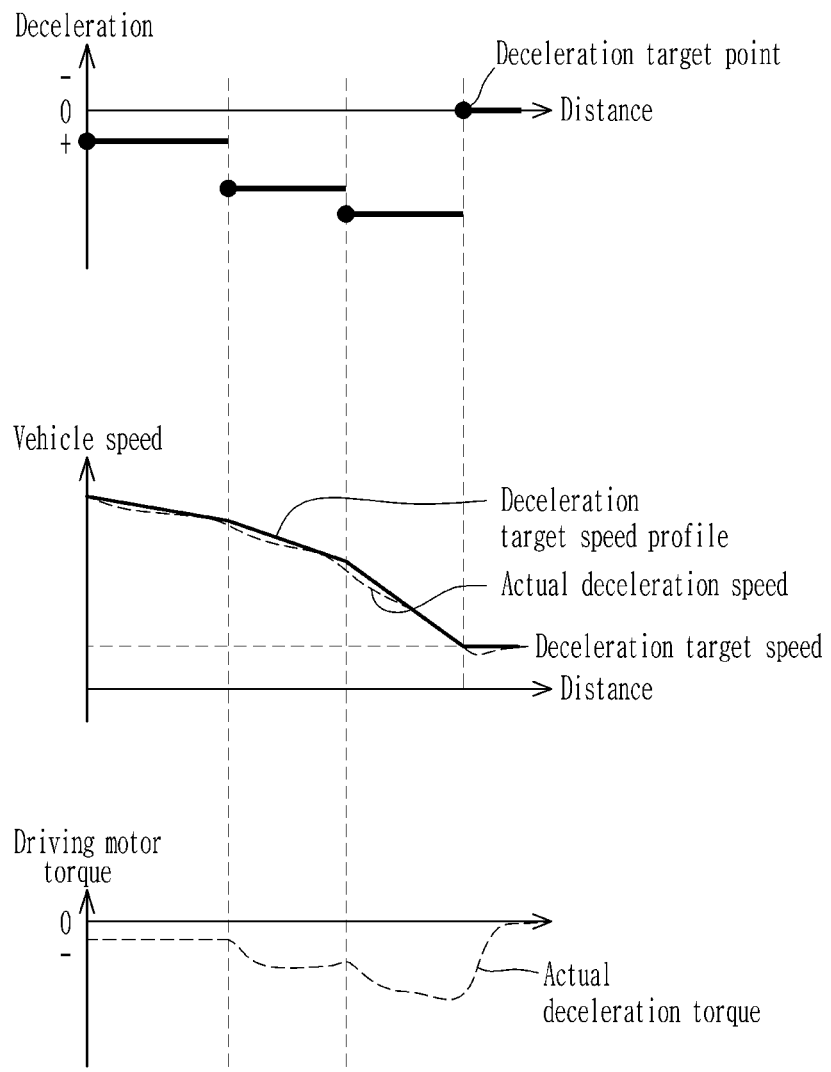
FIG. 6 is a view illustrating the process of determining the target deceleration profile shown in FIG. 2 according to an exemplary embodiment of the present invention.

FIG. 2 is a flowchart illustrating a deceleration control method for an environmentally friendly vehicle according to an exemplary embodiment of the present invention. FIG. 3 is a flowchart illustrating a process of determining a target deceleration profile of the environmentally friendly vehicle shown in FIG. 2. FIG. 4 is a flowchart illustrating the process of determining the target deceleration profile and calculating a deceleration target speed of the vehicle shown in FIG. 2. FIG. 5 is a block diagram illustrating the environmentally friendly vehicle to which the deceleration control method shown in FIG. 1 is applied. FIG. 6 is a view illustrating the process of determining the target deceleration profile shown in FIG. 2. FIG. 7 is a table illustrating an exemplary embodiment of the process of determining the target deceleration profile shown in FIG. 2.

Referring to FIGS. 2 to 7, in a reception step 100, a controller 405 mounted within the environmentally friendly vehicle 400 may be configured to receive deceleration event information in front or ahead of the vehicle via a receiver 410 such as a navigation device. For example, a deceleration event of the environmentally friendly vehicle 400 may include a toll gate, an interchange (IC), a speed camera, left/right turn of a vehicle (e.g., a preceding vehicle or vehicle traveling ahead of the vehicle), or a traffic signal. For example, the deceleration event information may include a final deceleration target speed of the vehicle 400, a slope or incline of a road on which the vehicle decelerates, information of a traffic light disposed on the road on which the vehicle decelerates, and traffic situation information on the road on which the vehicle decelerates.

The deceleration event information may include static traffic information, and dynamic traffic information including the traffic light information and the traffic situation information. The static traffic information may be a high precision map including a road gradient, a road curvature, toll gate position, interchange (IC) position, road limit speed, left/right turn information for a vehicle, speed hump position information, or speed camera position information. The traffic light information may include a signal change period, a green (e.g., go) signal time, a red (e.g., stop) signal time, a red signal remaining time, a green signal remaining time, a remaining distance to a traffic light, or position information of the traffic light. The traffic situation information may include the number of vehicles in each road section, a distance of a road section, or an average speed of a vehicle (e.g., a surrounding vehicle) in each road section. Based on the traffic situation information, the controller may be configured to determine whether a yellow (e.g., warning, yield, etc.) signal time is included in the red signal time or in the green signal time. For example, the yellow signal time may be included in the green signal time when the vehicle traffic flow is determined to be smooth (e.g., without congestion) based on the traffic situation information, and the yellow signal time may be included in the red signal time when the vehicle traffic flow is determined not to be smooth (e.g., with congestion) based on the traffic situation information. For safety of the vehicle, the yellow signal time may always be included in the red signal time.

The environmentally friendly vehicle 400 may include the controller 405, the receiver 410, and a driving motor 420 such as an electric motor. The motor 420 may be operated as a generator during coasting of the vehicle 400 to supply a voltage (or regenerative energy) to a battery within the vehicle. The battery may include a plurality of unit cells. A high voltage for providing a driving voltage (e.g., about 350-450 V DC) to the motor 420 that provides driving power to a driving wheel of the vehicle may be stored in the battery. A telematics server may be a server disposed extraneous to the environmentally friendly vehicle 400 and may provide the deceleration event information to the receiver 410 via communication.

For example, the controller 405 may be one or more microprocessors operated by a program or hardware including the microprocessor. The program may include a series of commands for executing the method for controlling deceleration of the environmentally friendly vehicle according to the exemplary embodiment of the present invention. The commands may be stored in a memory. The controller 405 may be configured to execute overall operation of the vehicle 400. The receiver 205 may include a global positioning system (GPS) receiver configured to generate position information of the vehicle 400.

According to a determination step 105, as shown in FIGS. 6 and 7, the controller 405 may be configured to determine a target deceleration profile of the environmentally friendly vehicle 400 based on the deceleration event information and a current speed of the vehicle. A target deceleration of the target deceleration profile may be large when the current speed of the environmentally friendly vehicle 400 is small. A speed of the environmentally friendly vehicle 400 may be detected by a speed sensor of the environmentally friendly vehicle and may be provided to the controller 405. The speed sensor may be mounted to the wheel of the environmentally friendly vehicle 400.

The target deceleration profile shown in FIG. 7 may be determined by a test or experiment to be stored in a memory (e.g., a map table) of the environmentally friendly vehicle 400. The stored target deceleration profile may be transmitted to the controller 405. The target deceleration a, b, c, d, or e of the target deceleration profile of FIG. 7 may correspond to speeds of a predetermined range including the current speed of the environmentally friendly vehicle 400.

Referring to FIG. 7, for example, when the current speed of the environmentally friendly vehicle 400 exceeds about 100 (KPH), the target deceleration may be "a". When the current speed of the environmentally friendly vehicle 400 is greater than about 20 (KPH) and less than about 40 (KPH), the target deceleration may be "e". A target deceleration value of FIG. 7 may correspond to a target acceleration value and may be greater than zero.

When a road (e.g., an uphill road, a downhill road, or a flat road) on which the vehicle 400 decelerates has an incline or slope, the target deceleration profile may be corrected as shown in FIG. 3. According to a step 200 of FIG. 3, the controller 405 may be configured to store the target deceleration profile as a default value in a memory. According to a step 205, the controller 405 may be configured to determine a corrected target deceleration profile by correcting the target deceleration profile in real time based on the slope of the road and an equation below.

$$\text{Corrected deceleration} = \text{Target deceleration} - g \cdot \sin(\theta)$$

In the equation, g may be an acceleration of gravity and θ may be the slope of the road. A unit of θ may be radian.

Referring to FIG. 2, in a step 110, the controller 405 may be configured to calculate a deceleration target speed profile of the environmentally friendly vehicle 400 based on the target deceleration profile or the corrected target deceleration profile. For example, the controller 405 may be configured to calculate the deceleration target speed profile by integrating the target deceleration profile based on deceleration travel distance or deceleration travel time of the vehicle 400 over the deceleration travel time. When the target deceleration profile is a uniform deceleration profile, the controller 405 may be configured to calculate a deceleration target speed (v) of the deceleration target speed profile using the following equations of uniform deceleration motion.

$$2as = v^2 - v_0^2$$

$$v^2 = 2as + v_0^2$$

$$v = \sqrt{2as + v_0^2}$$

In the equation, a may be a uniform deceleration, s may be travel distance of the vehicle 400, and $V_0$ may be an initial driving speed of the vehicle.

When the controller 405 receives the deceleration event information including the traffic light information and the traffic situation information that are related to the driving of the environmentally friendly vehicle 400 via the receiver 410, as shown in FIG. 4, the target deceleration profile and the deceleration target speed profile may be corrected. According to a step 300 of FIG. 4, the controller 405 may be configured to receive the deceleration event information including the information of the traffic light and the traffic situation information via the receiver 410.

According to a step 305, the controller 405 may be configured to determine whether the environmentally friendly vehicle 400 is predicted to be stopped due to a signal of the traffic light disposed on the road on which the vehicle decelerates based on the traffic light information and the traffic situation information. For example, when a time for the environmentally friendly vehicle 400 to pass through the traffic light is equal to a red signal remaining time of the traffic light due to a vehicle in front of the traffic light, the controller 405 may be configured to predict that the environmentally friendly vehicle 400 is to be stopped due to the traffic light. According to a step 310, in response to determining that the environmentally friendly vehicle 400 will be stopped due to the traffic light, the controller 405 may be configured to advance a deceleration target point of the vehicle shown in FIG. 6 to determine the target deceleration profile.

According to a step 315, when the environmentally friendly vehicle 400 is predicted not to be stopped due to the traffic light, the controller 405 may be configured to determine whether the vehicle is decelerated due to the signal of the traffic light based on the traffic light information and the traffic situation information. For example, when the time for the environmentally friendly vehicle 400 to pass through the traffic light is less than the red signal remaining time of the traffic light due to a vehicle in front of the traffic light, the controller 405 may be configured to determine that the vehicle is decelerated due to the traffic light.

According to a step 320, in response to determining that the environmentally friendly vehicle 400 is decelerated due to the traffic light, the controller 405 may be configured to reduce the deceleration target speed of the deceleration target speed profile. Referring to FIG. 2, in a step 115, the controller 405 may be configured to decelerate the environmentally friendly vehicle 400 by operating the driving motor 420 of the vehicle based on the deceleration target speed profile. According to a step 120, the controller 405 may be configured to determine whether the environmentally friendly vehicle 400 reaches the deceleration target point based on the deceleration event information.

When the environmentally friendly vehicle 400 does not reach the deceleration target point, the deceleration control method of the environmentally friendly vehicle, which is a process, may proceed to the step 115. When the environmentally friendly vehicle 400 reaches the deceleration target point, the deceleration control method of the environmentally friendly vehicle may be terminated.

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

DESCRIPTION OF SYMBOLS

405: controller
410: receiver
420: driving motor

What is claimed is:

1. A method for controlling deceleration of an environmentally friendly vehicle, comprising:
    determining, by a controller, a target deceleration profile of the environmentally friendly vehicle based on deceleration event information ahead of the vehicle and a current speed of the vehicle;
    calculating, by the controller, a deceleration target speed profile of the vehicle based on the target deceleration profile; and
    operating, by the controller, a driving motor of the vehicle based on the deceleration target speed profile to decelerate the vehicle,
    wherein a target deceleration of the target deceleration profile is greater than a predetermined target deceleration when the current speed of the vehicle is less than a predetermined speed, and
    wherein the target deceleration of the target deceleration profile corresponds to speeds of a predetermined range including the current speed of the vehicle.

2. The method of claim 1, wherein the determining of the target deceleration profile of the environmentally friendly vehicle includes:
    in response to detecting that a road on which the vehicle decelerates has a slope, determining, by the controller, the target deceleration profile using the slope of the road.

3. The method of claim 1, further comprising:
    in response to receiving the deceleration event information including traffic light information and traffic situation information that are related to driving of the vehicle, determining, by the controller, whether the vehicle is predicted to be stopped due to a traffic light included in the traffic light information based on the traffic light information and the traffic situation information; and advancing, by the controller, a deceleration target point of the vehicle to determine the target deceleration profile in response to determining that the vehicle will be stopped due to the traffic light.

4. The method of claim 3, further comprising:
when the vehicle is predicted not to be stopped due to the traffic light, determining, by the controller, whether the vehicle is decelerated due to the signal of the traffic light based on the traffic light information and the traffic situation information; and
in response to determining that the vehicle is decelerated due to the traffic light, reducing, by the controller, a deceleration target speed of the deceleration target speed profile.

5. The method of claim 1, wherein the calculating of the deceleration target speed profile of the vehicle includes:
calculating, by the controller, the deceleration target speed profile by integrating the target deceleration profile over deceleration travel time of the vehicle.

6. The method of claim 1, wherein the deceleration event information includes static traffic information and dynamic traffic information.

7. A system for controlling deceleration of an environmentally friendly vehicle, comprising:
a memory configured to store program instructions; and
a processor configured to execute the program instructions, the program instructions when executed configured to:
determine a target deceleration profile of the environmentally friendly vehicle based on deceleration event information ahead of the vehicle and a current speed of the vehicle;
calculate a deceleration target speed profile of the vehicle based on the target deceleration profile; and
operate a driving motor of the vehicle based on the deceleration target speed profile to decelerate the vehicle,
wherein a target deceleration of the target deceleration profile is greater than a predetermined target deceleration when the current speed of the vehicle is less than a predetermined speed, and
wherein the target deceleration of the target deceleration profile corresponds to speeds of a predetermined range including the current speed of the vehicle.

8. The system of claim 7, wherein the program instructions executed to determine the target deceleration profile of the environmentally friendly vehicle include:
in response to detecting that a road on which the vehicle decelerates has a slope, program instructions that determine the target deceleration profile using the slope of the road.

9. The system of claim 7, wherein the program instructions when executed are further configured to:
in response to receiving the deceleration event information including traffic light information and traffic situation information that are related to driving of the vehicle, determine whether the vehicle is predicted to be stopped due to a traffic light included in the traffic light information based on the traffic light information and the traffic situation information; and
advance a deceleration target point of the vehicle to determine the target deceleration profile in response to determining that the vehicle will be stopped due to the traffic light.

10. The system of claim 9, wherein the program instructions when executed are further configured to:
when the vehicle is predicted not to be stopped due to the traffic light, determine whether the vehicle is decelerated due to the signal of the traffic light based on the traffic light information and the traffic situation information; and
in response to determining that the vehicle is decelerated due to the traffic light, reduce a deceleration target speed of the deceleration target speed profile.

11. The system of claim 7, wherein the program instructions for calculating the deceleration target speed profile of the vehicle when executed are further configured to:
calculate the deceleration target speed profile by integrating the target deceleration profile over deceleration travel time of the vehicle.

12. The system of claim 7, wherein the deceleration event information includes static traffic information and dynamic traffic information.

* * * * *